United States Patent
Leblanc et al.

(10) Patent No.: US 7,378,771 B2
(45) Date of Patent: May 27, 2008

(54) FDB MOTOR WITH TAPERED SHAFT FOR IMPROVED PUMPING EFFICIENCY

(75) Inventors: Jeffry A. Leblanc, Aptos, CA (US); Troy M. Herndon, San Jose, CA (US); Mohammad M. Ameen, Cupertino, CA (US); Raquib U. Khan, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 262 days.

(21) Appl. No.: 11/083,820

(22) Filed: Mar. 17, 2005

(65) Prior Publication Data

US 2005/0207913 A1 Sep. 22, 2005

Related U.S. Application Data

(60) Provisional application No. 60/554,961, filed on Mar. 19, 2004.

(51) Int. Cl.
*H02K 5/16* (2006.01)
(52) U.S. Cl. .................................................. 310/90
(58) Field of Classification Search ................. 310/90, 310/90.5
See application file for complete search history.

(56) References Cited

U.S. PATENT DOCUMENTS

| | | | |
|---|---|---|---|
| 4,734,606 A * | 3/1988 | Hajec | 310/90.5 |
| 5,559,651 A | 9/1996 | Grantz et al. | |
| 6,144,523 A | 11/2000 | Murthy et al. | |
| 6,664,685 B2 | 12/2003 | Ameen et al. | |
| 6,965,493 B2 * | 11/2005 | Obara | 360/99.08 |

FOREIGN PATENT DOCUMENTS

JP      2003-254325      *    9/2003

* cited by examiner

*Primary Examiner*—Dang Le
*Assistant Examiner*—Hanh Nguyen
(74) *Attorney, Agent, or Firm*—Stephen C. Durant; Novak Druce & Quigg LLP

(57) ABSTRACT

For motors having a journal with one or more groove regions and a shaft for relative rotation in the journal, aspects include providing a dual tapered shaft. The shaft may be tapered by the application of a wear resistant coating at least opposite the groove regions. The coating introduces a shaft taper from near a top end and from near a bottom end towards the shaft middle. The shaft taper may provide for improved pumping efficiency. The coating may be applied in various processes such as chemical vapor deposition or physical vapor deposition to establish a thickness gradient of coating material from near the top end and near the bottom end towards the shaft middle. In one example, the coating includes a DLC coating. Additionally, shaft portions may be shielded to prevent coatings thereon.

16 Claims, 4 Drawing Sheets

FDB MOTOR WITH TAPERED SHAFT FOR IMPROVED PUMPING EFFICIENCY

RELATED APPLICATION

This application is related to and claims benefit of priority from U.S. Provisional Patent Application No. 60/554,961, filed on Mar. 19, 2004, and which is fully incorporated by reference herein as if fully set forth herein.

BACKGROUND

The present invention relates to grooved regions, such as pumping seal regions, in Fluid Dynamic Bearing (FDB) motors, and more particularly to increasing pumping efficiency and/or reducing component wear near grooved regions of FDB motors.

DESCRIPTION OF RELATED ART

Groove regions, such as grooved pumping seal regions, have been used in FDB motors. Some such FDB motors have a predominantly straight journal bearing formed by opposing inner and outer surfaces of relatively rotating components. By example, a journal bearing may be formed between an inner surface of a bearing sleeve and an outer surface of a shaft. Such journal bearings are designed to maintain a gap between the inner and outer surfaces. Lubricating liquid may be disposed in the gap.

Grooved regions, such as grooved pumping seal regions, are typically disposed at one or both ends of the relatively rotating components. The grooved regions may be for pumping lubricating liquid away from openings from which lubricating liquid may escape and/or evaporate. The grooved regions may also be for establishing a minimum flow of lubricating liquid within portions of the motor. Grooved regions may tend to evacuate lubricating liquid from a portion of the journal, and therefore there is some danger that the relatively rotating components may contact each other if jolted or jarred during operation (op shock event). That contact may induce wear in the components and may increase risk of premature drive failure.

SUMMARY

In exemplary aspects, a shaft for an FDB motor comprises an elongate member having an outer radial surface extending from a first end to a second end and a coating disposed on the outer radial surface of the member. In one example the shaft is tapered from relatively wide diameters at the first and second ends of the shaft to a relatively narrow diameter between the first and second ends of the shaft. A shaft having such dual tapered regions may increase the pumping efficiency of a fluid dynamic bearing within an FDB motor.

In one example, the taper is achieved through the application of a wear resistant coating. The coating may be disposed from near the first end and extending towards a middle of the member. The coating may further be disposed from near the second end and extending towards the middle of the member. The coating is provided with greater thickness near the first end and the second end than near the middle of the member. The coating may be a DLC coating, a ceramic coating, or some other wear resistant coating depositable through suitable processes such as chemical vapor deposition processes and physical vapor deposition processes.

The outer radial surface may be substantially cylindrical in the absence of the coating disposed thereon, and after disposition of the coating, the coated outer radial surface may taper in diameter from the first end towards the middle of the member and from the second end towards the middle of the member. Portions of the shaft, such as a first end face and a second end face may be maintained substantially free of the coating.

The coating may be disposed on outer radial surface by providing first coating material from the first end directed obliquely at the outer radial surface and by providing second coating material from the second end directed obliquely at the outer radial surface.

Other exemplary aspects include a motor that comprises a bearing sleeve with a journal. The journal has a top end, a bottom end, first grooves disposed on an interior surface of the journal, and second grooves disposed on the interior surface. The motor further comprises a shaft disposed in the journal. The shaft comprises an elongate member having a first end, a second end, and an outer radial surface. A first coating may be formed at least on a portion of the outer radial surface opposing the first grooves. The first coating may taper in thickness from the first end of the member towards the second end of the member. A second coating may also be formed on the outer radial surface at least on a portion of the outer radial surface opposing the second grooves. The second coating may taper in thickness from the second end of the member towards the first end of the member.

Methods for forming coatings on relatively rotatable motor members according to aspects of the invention may include providing an elongate member symmetric about at least one axis of rotation. The member may have a first end, a second end, and an outer radial surface extending from the first end to the second end. The methods may further comprise forming a first coating on the outer radial surface, where the first coating tapers in thickness from near the first end towards the second end, and forming a second coating on the outer radial surface, where the second coating tapers in thickness from near the second end towards the first end.

BRIEF DESCRIPTION OF THE DRAWINGS

For describing aspects and examples herein, reference is made to the accompanying drawings in the following description.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of motors, including motors for use in disc storage drives. Motors for disc storage drives may be designed and may operate in a number of ways. Exemplary subject matter provided herein is for illustrating various inventive aspects and is not intended to limit the range of motors and devices in which in such subject matter may be applied.

Figure 1:
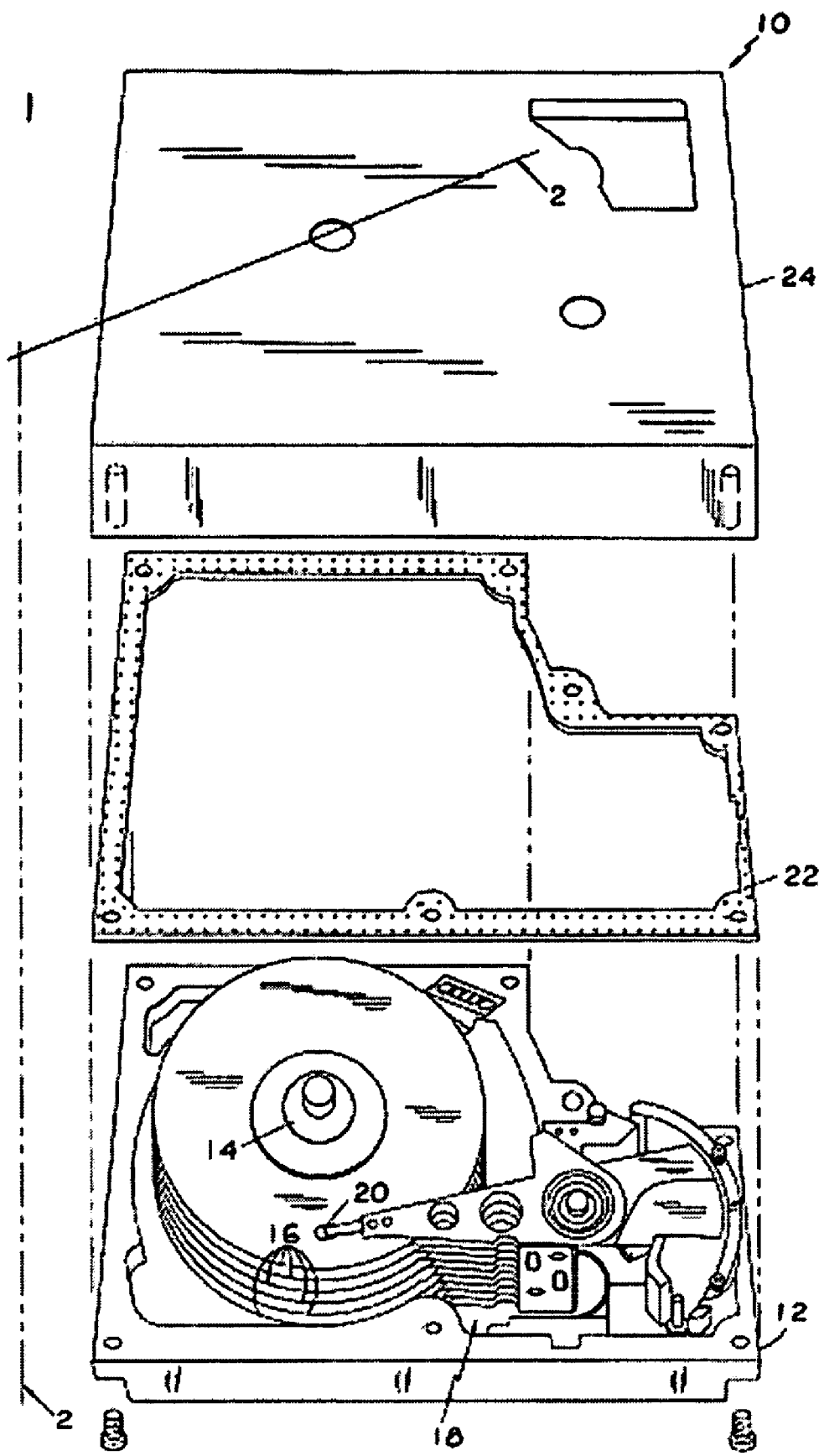
FIG. 1 illustrates a plan view of an exemplary disc drive.

Turning briefly to FIG. 1, a plan view of an exemplary magnetic disc drive storage system is illustrated. In this example, the storage system 10 includes a housing base 12 having spindle motor 14 that rotatably carries storage discs 16. An armature assembly 18 moves transducers 20 across the surface of the discs 16. The environment in which discs 16 rotate may be sealed by seal 22 and cover 24. In operation, discs 16 rotate at high speed while transducers 20 are positioned at any one of a radially differentiated track on the surface of the discs 16. This allows transducers 20 to read and write magnetically encoded information on the surfaces of discs 16 at selected locations. Discs 16 may rotate at many thousands of RPM.

To produce rotation of discs 16, spindle motor 14 typically includes at least one rotatable portion. The at least one rotatable portion is in turn typically supported by one or more bearing surfaces providing a low friction interface with a relatively non-rotating surface. In some exemplary motors, a shaft may rotate within a journal of a fixed bearing sleeve while in others the shaft may be stationary and the bearing sleeve may rotate about the shaft. Aspects described herein may be used in any such motor types, even where described with reference to only one of these motor types.

Figure 2:
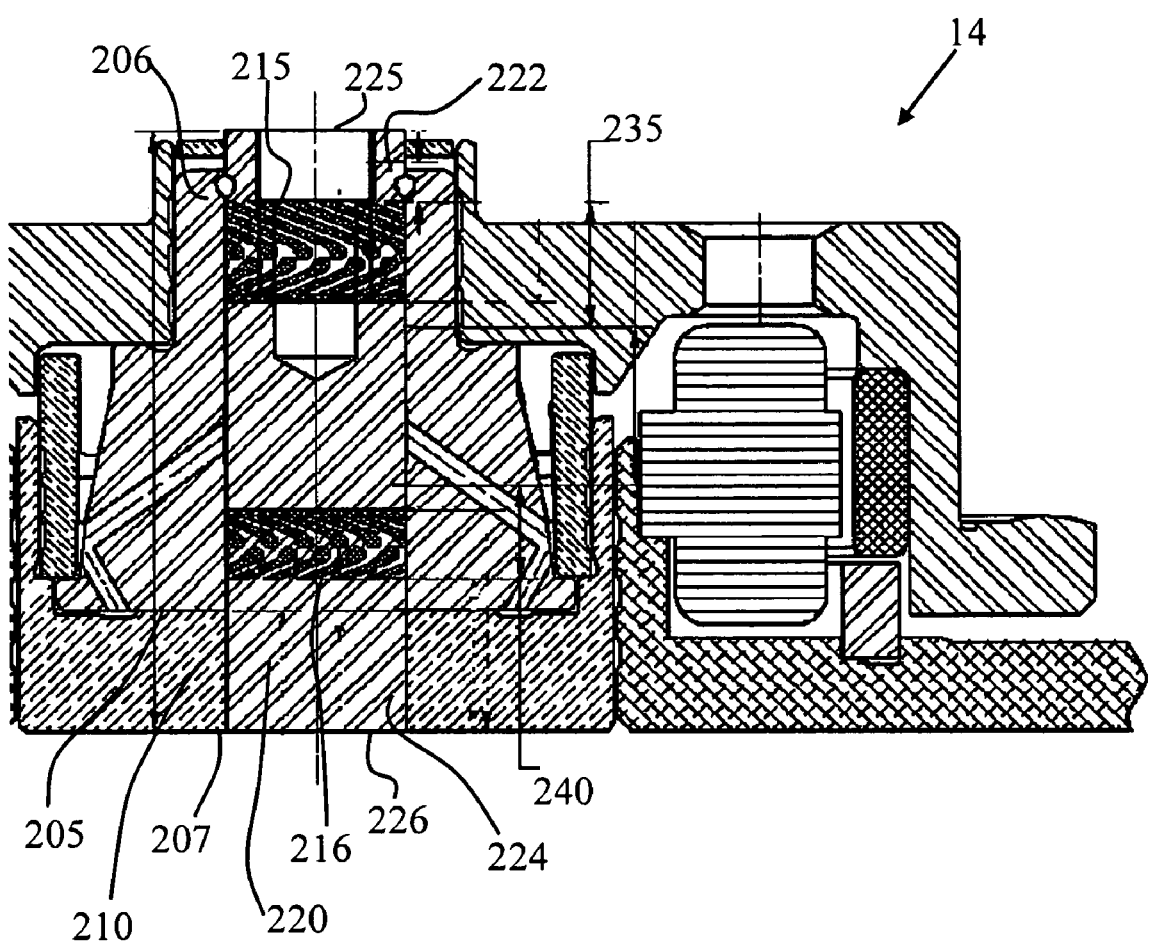
FIG. 2 illustrates a cross-section of a motor having a shaft relatively rotatable with respect to a journal of a bearing sleeve.

Turning now to FIG. 2, a cross-section of an exemplary spindle motor 14 is illustrated. Motor 14 includes a bearing sleeve 205 with a journal 210 defined by an interior surface (not separately indicated). As illustrated, exemplary journal 210 extends from a top 206 of bearing sleeve 205 to a bottom 207 of bearing sleeve 205. Journal 210 includes groove region 215 and groove region 216 disposed circumferentially on the interior surface that defines journal 210. Groove region 215 and/or groove region 216 may be asymmetrical and may function as pumping seals and/or to recirculate lubricating liquid through portions of motor 14. A shaft 220 is disposed within journal 210. Shaft 220 includes an outer radial surface 221 (illustrated in FIG. 3) that radially opposes the interior surface of journal 210, thereby forming a gap (not separately indicated) where a hydrodynamic bearing region provides for low friction rotation of shaft 220 in journal 210. The gap between the interior surface and shaft 220 may vary in size and shape amongst motor designs.

Shaft 220 may generally be an elongate member with outer radial surface 221 extending from a first end 222 to a second end 224. In some aspects, shaft 220 may be approximately cylindrical, and first end 222 may have an approximately circular first end surface 225. Likewise, second end 224 may have an approximately circular second end surface 226. If desirable, shaft 220 may be crowned or conical (e.g., having a larger diameter at one end) for a journal of a corresponding shape.

First end 222 of shaft 220, first coating region 235 is identified in FIG. 2 by demarcating (by beginning and ending arrows) a portion of outer radial surface 221 having first coating region 235. In aspects, coating region 235 extends along outer radial surface 221 at least where outer radial surface 221 opposes groove region 215 (i.e., coating region 235 is at least disposed radially opposite groove region 215). Coating region 235 may be also be additionally disposed more proximate first end 222 and more proximate second end 224. In some aspects, coating region 235 extends approximately to but not entirely to first end 222; additionally first end surface 225 may be left uncoated.

Like coating region 235, second coating region 240 extends along outer radial surface 221 at least where outer radial surface 221 opposes groove region 216 (i.e., coating region 240 is at least disposed radially opposite groove region 216). As further illustrated, coating region 240 may be more extensively disposed towards both first end 222 and second end 224. In aspects, coating region 240 extends approximately to second end 224, but not entirely to second end 224. In some aspects, second end surface 226 is left uncoated. Aspects of shaft 220, coating region 235, and coating region 240 are further described with regard to FIG. 3.

Figure 3:
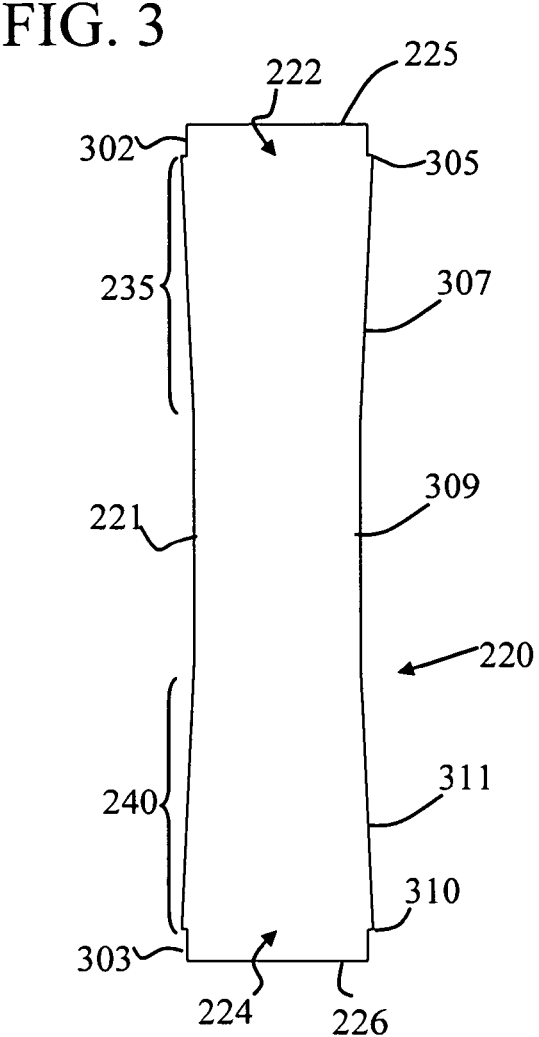
FIG. 3 schematically illustrates a vertical cross-section of the shaft.

FIG. 3 illustrates an exemplary schematic vertical cross-section of shaft 220. This exemplary cross-section is not drawn to scale so that aspects may be better illustrated. As described above, shaft 220 includes first end 222 and second end 224. Outer radial surface 221 extends from first end 222 to second end 224 (and vice versa).

Coating region 235 may be disposed on outer radial surface 221 proximate first end 222. As illustrated and described above, a portion 302 of outer radial surface 221 closer to first end 222 than coating region 235 may remain uncoated. Exemplary coating region 235 is generally thicker more proximate than distal first end 222 (i.e., coating region 235 becomes thinner closer to second end 224). In aspects, coating 235 may taper monotonically from near first end 222 towards second end 224. A maximum thickness of coating 235 may vary amongst designs. A thickness of coating region 235 near a middle portion 309 of outer radial surface 221 may be negligible or non-existent compared with a size of the gap in middle portion 309 (i.e., the coating may be very thin or non-existent). Middle portion 309 may be covered to prevent a coating from being formed thereon. Coating region 235 may terminate abruptly near first end 222, as illustrated by shoulder 305. Coating region 235 may be considered to have a shape approximating a three-dimensional conical annulus (if considered separately from outer radial surface 221 of shaft 220, upon which coating region 235 is applied).

Like coating region 235, coating region 240 may be disposed on outer radial surface 221, except that coating 240 may be disposed near second end 224. A portion 303 of outer radial surface 221 closer to second end 224 than coating region 240 may remain uncoated. Exemplary coating region 240 is generally thicker more proximate than distal second end 224 (i.e., coating region 240 becomes thinner closer to first end 222). In aspects, coating 240 may taper monotonically from near second end 224 towards first end 222. A maximum thickness of coating 240 may vary amongst designs. A thickness near the middle portion 309 of outer radial surface 220 may be negligible or non-existent compared with a size of the gap in middle portion 309. Coating region 235 may terminate abruptly near second end 224, such that coating region 240 may have a shape approximating a conical annulus (if considered separately from outer radial surface 221 of shaft 220, upon which coating region 235 is applied).

Figure 4A:
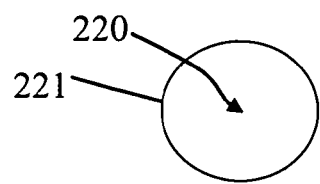
FIGS. 4a-d schematically illustrate various portions of the coated shaft.

Exemplary cross-sections of shaft 220 and coating region 235 disposed thereon are illustrated in FIGS. 4a-d. FIGS. 4a-d are not drawn to scale, but instead are drawn for illustrating various aspects discussed below. FIG. 4a illustrates a portion of shaft 220 proximate first end 222 and substantially without coating. In aspects, coating region 235 and coating region 240 may be disposed to make shaft 220 approximately symmetric about a center of the shaft. (i.e., thicknesses of each coating region may be approximately circumferentially equal at equivalent distances from respective ends of the shaft). Coating region 235 may also be radially symmetric in thickness at a given distance from first end 222 (and likewise for coating region 240 from second end 224).

Figure 4B:
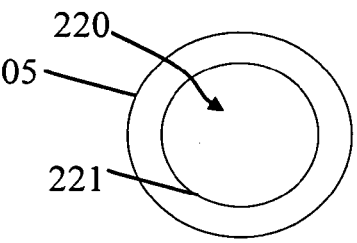

FIG. 4b illustrates a thicker portion of coating region 235, designated as shoulder 305 in FIG. 3 (and may also illustrate a thicker portion of coating region 240, at shoulder 310 in FIG. 3). In FIG. 4b, the approximately annular shape of each cross-section of coating region 235 and of coating region 240 is evident upon recognizing shaft 220, about which coating region 235 and coating region 240 are disposed.

Figure 4C:
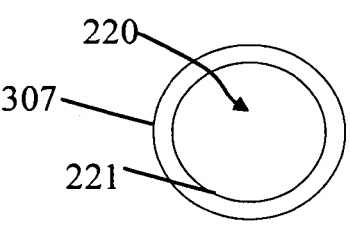
Figure 4D:
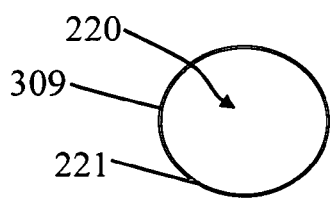

FIG. 4c illustrates a central portion of coating region 235, designated at 307 in FIG. 3. As illustrated, the coating thickness at 307 is thinner than the thickness at 305 illustrated in FIG. 4b. FIG. 4d illustrates a thinner portion of coating region 235 near the shaft middle 309 (approximately designated). As illustrated, a thickness of coating region 235 at 309 begins to be negligible compared with the radius (diameter) of shaft 220. As discussed above, middle portion 309 may be shielded during coating deposition so as to keep middle portion 309 substantially free from coating. FIGS. 4c and 4d may also illustrate corresponding portions of coating region 240, as one of ordinary skill in the art would comprehend.

Coating region 235 and coating region 240 may be comprised of suitable coating material deposited on outer radial surface 221 (and on already deposited coating material as the coating regions increase in thickness). Low-temperature chemical and/or vapor deposition processes, and other deposition processes may be used to provide the coating material.

Coating material may include any variety of diamond like coating materials and ceramic type materials. In aspects, coating region 235 and coating region 240 may comprise multiple separate coatings, where each separate coating may be of, or include, a different material. By example, a first layer of coating region 235 may be a layer designed to improve adhesion of a later disposed carbon rich layer to outer radial surface 221. Coating material may also be disposed in numerous coatings, depending on a desired coating thickness and devices used in forming the coating (e.g., some machines may be limited in growth rate per time, or the shaft 220 may be examined during coating deposition).

In exemplary aspects, coating region 235 and coating region 240 may be approximately 0.5-3.0 μm thick at their thickest respective points and taper uniformly towards shaft middle 309. In exemplary aspects, near shaft middle 309 coating region 235 and/or coating region 240 may be of negligible thickness, for example, less than 0.5 μm, and in some examples may not coat the entirety of outer radial surface 221 near shaft middle 309 (i.e., coating material may be disposed near shaft middle 309, but the coating material may not form a continuous coating region). For other background relating to coatings, refer to U.S. Pat. No. 6,664,685, entitled, "HIGH ADHESION, WEAR RESISTANT COATINGS FOR SPINDLE MOTORS IN DISK DRIVE/STORAGE APPLICATIONS," filed on Dec. 13, 2001, which is incorporated in its entirety by reference.

Devices for carrying out such processes are disposed to cause coating material to be provided about outer radial surface 221. In aspects, while forming coating region 235, the coating material may be provided for greater thickness near first end 222 than towards second end 224, and at approximately constant thickness circumferentially around outer radial surface 221 at a given distance from first end 222. Coating region 240 may be formed under respective similar conditions.

An exemplary way to establish the coating material thickness described above is to provide the coating material from near first end 222 for establishing coating region 235. Likewise, for establishing coating region 240, coating material may be provided from near second end 224. In so doing, a desired differential in thickness may be established through diffusion along outer radial surface 221 from a source of coating material. One aspect that may be understood by one of skill in the art is that the surface coated (outer radial surface 221) lies substantially parallel to a source direction of coating material. By contrast, generally surfaces coated with DLC material or the like are coated by material provided from a direction substantially perpendicular to the surface to be coated. Advantageously, providing coating material in such a manner more easily establishes a desirable taper shape for each of coating region 235 and coating region 240.

Figure 5:
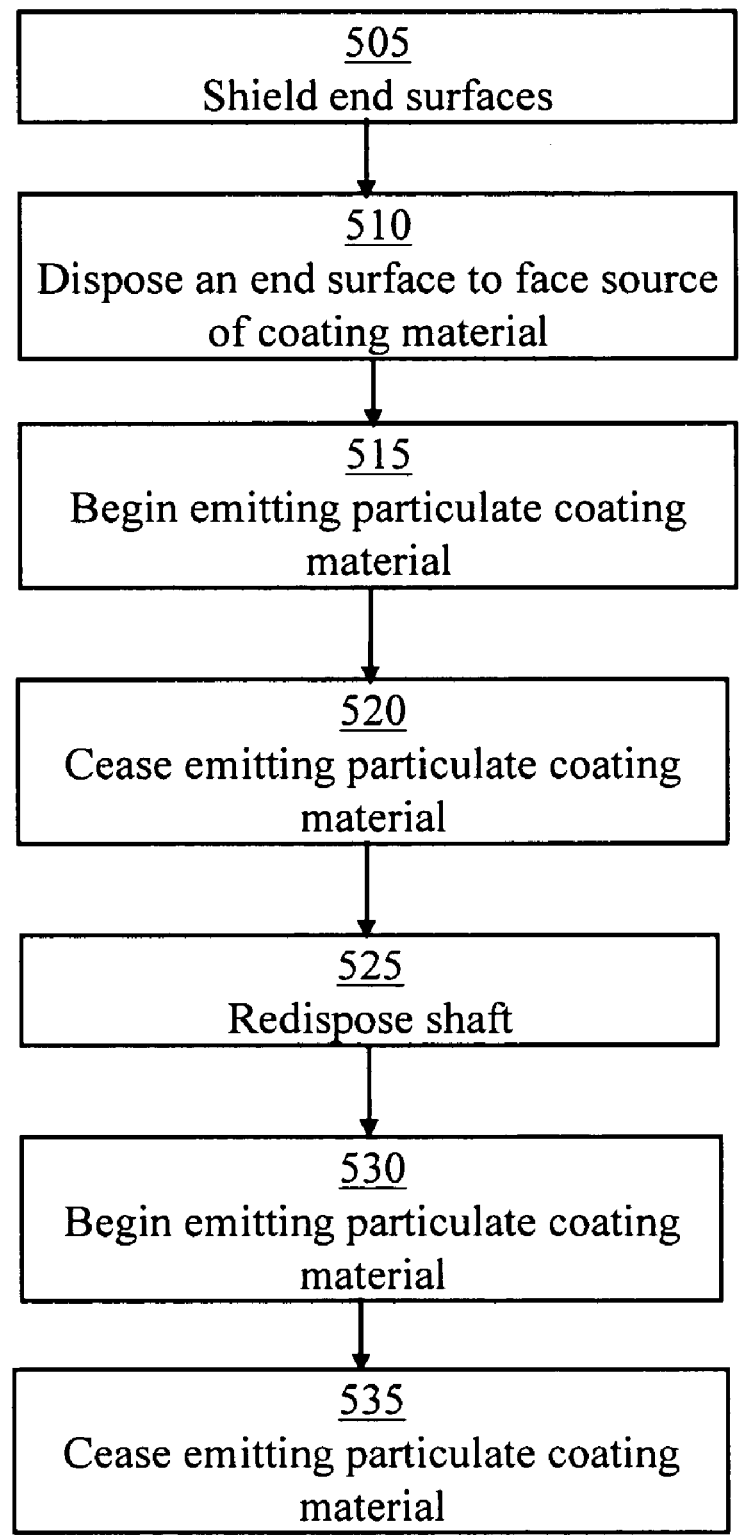
FIG. 5 illustrates exemplary steps of a method for forming coatings on the shaft.

FIG. 5 illustrates exemplary steps of a method for forming coating region 235 and coating region 240 on shaft 220. Step 505 includes shielding first end surface 225 and second end surface 226; the shielding may extend along portion(s) of outer radial surface 221 near respective first end 222 and/or second end 224. An amount of outer radial surface 221 covered may compensate for shadow effects caused by the shielding such that coating region 235 substantially begins at a desired point on outer radial surface 221 (e.g., shoulder 305 in FIG. 3) and at an appropriate thickness (as selected for a specific design). Of course, one or both of first end surface 225 and second end surface 226 may be covered to prevent coating formation thereon, if desired for a particular application.

Step 510 includes relatively disposing a first source of material and shaft 220 so that one of first end surface 225 and second end surface 226 opposes the first source of coating material. Step 515 includes beginning to emit coating material from the first source into a region surrounding outer radial surface 221 (i.e., into the immediate volume around shaft 220). Step 520 includes ceasing to emit coating material from the first source after a predetermined amount of time has elapsed. Step 525 includes redisposing shaft 220 so that the other of the first end surface 225 and the second end surface 226 (the one disposed distal the source at 510) faces the first source. Step 530 includes beginning to emit coating material from the first source. Step 535 includes ceasing to emit coating material from the first source after the predetermined amount of time has again elapsed.

First end surface 225 and second end surface 226 may each be disposed approximately perpendicular to the source such that outer radial surface is approximately parallel to the source. In such relative dispositions, coating material may contact outer radial surface 221 obliquely. First end surface 225 and second end surface 226 may also be disposed at some angle to the source. By rotating shaft 220 frequently, an approximately uniform cross-sectional coating thickness may be established (i.e., each cross-section has an approximately constant thickness about outer radial surface 221. Other adjustments may be made as necessary to establish a uniform coating growth rate at a given distance from the source along outer radial surface 221.

In a variation on the method of FIG. 5, a second source of material may be relatively disposed with shaft 220 to face the other of the first end surface 225 and the second end surface 226. Further modifications may include beginning to emit coating material from the second source in step 515, and ceasing to emit coating material from the second source in step 520 after the predetermined amount of time has elapsed. In such a variation, step 525 may be eliminated, since there may be no need to redispose shaft 220 as coating region 235 and coating region 240 may be created together.

Other variations may include disposing shield near the middle portion 309 of shaft 220. Still other variations may include shielding portions of shaft 220 for a portion of the predetermined amount of time and exposing those portions for a remaining time. Further variations may include emitting matter for different amounts of time from each source to establish asymmetrical coatings. Still further variations may include measuring coating thickness during deposition and ceasing provision of matter when a desired thickness has been achieved (in addition to or in place of emitting coating material for the predetermined time). Deposition may also be conducted in numerous discrete time intervals, rather than providing matter for a single predetermined time. Shaft 220 may be disposed on a stationary holder or a conveyor that moves parallel to the first and/or the second matter source. One of skill in the art would understand that coating region 240 may be formed before, after, or simultaneously with coating region 235. Other modifications and variations may be apparent to one of skill in the art.

To summarize certain aspects of the invention, a thickness gradient of coating material may be established from first end 222 and extending towards middle portion 309. The thickness gradient would provide for relatively large thickness near first end 222 and for decreasing thickness more distal first end 222. A similar thickness gradient may be established from second end 224 by either a separate source of coating material or by the same source after coating region 235 has been formed (or vice versa if coating region 240 were formed first).

Various motor and FDB aspects have been illustrated and described herein. One of ordinary skill in the art would understand that teachings related to each may be adapted to other designs. Also, it would be understood that certain components have been separately identified herein, but such identification does not imply that such components must be separately formed from other components. Similarly, components identified herein may be subdivided into sub-components in other designs. Additionally, illustrated features such as recirculation channels, bearing surfaces, pumping grooves, and the like may be disposed additionally or differently than presented in aspects herein.

Other modifications and variations would also be apparent to those of ordinary skill in the art from the exemplary aspects presented. By example, various exemplary methods and systems described herein may be used alone or in combination with various fluid dynamic bearing and capillary seal systems and methods. Additionally, particular examples have been discussed and how these examples are thought to address certain disadvantages in related art. This discussion is not meant, however, to restrict the various examples to methods and/or systems that actually address or solve those disadvantages.

We claim:

1. A motor comprising:
 a bearing sleeve having a journal, the journal having a top end, a bottom end, first grooves disposed on an interior surface of the journal, and second grooves disposed on the interior surface; and
 a shaft disposed in the journal, the shaft comprising:
 an elongate member having a first end, a second end, and an outer radial surface, wherein a diameter of the outer radial surface is tapered in thickness from proximate the first end towards the middle and tapered in thickness from proximate the second end towards the middle;
 wherein the shaft includes a cylindrical shaped member having a coating that varies in thickness.

2. The motor of claim 1, wherein the coating comprises a diamond like coating.

3. A motor comprising:
 a bearing sleeve having a journal, the journal having a top end, a bottom end, first grooves disposed on an interior surface of the journal, and second grooves disposed on the interior surface; and
 a shaft disposed in the journal, the shaft comprising:
 an elongate member having a first end, a second end, and an outer radial surface, wherein a diameter of the outer radial surface is tapered in thickness from proximate the first end towards the middle and tapered in thickness from proximate the second end towards the middle;
 wherein the elongate member includes a coating at the outer radial surface, the coating disposed proximate the first end and extending towards a middle of the member and further disposed proximate the second end and extending towards the middle of the member, the coating thicker proximate the first end and the second end than proximate the middle.

4. The motor of claim 3, wherein the first end includes a first end face and the second end includes a second end face, and the first end face and the second end face are substantially free of the coating.

5. The motor of claim 3, wherein the outer radial surface includes a portion most proximate the first end substantially free of the coating, and a portion most proximate the second end substantially free of the coating.

6. The motor of claim 3, wherein the coating at a thickest point proximate the first end has a thickness between 0.5 μm and 3.0 μm, and at a thickest point proximate the second end has a thickness between 0.5 μm and 3.0 μm.

7. The motor of claim 6, wherein the coating at the outer radial surface proximate the middle of the member is less than 0.5 μm.

8. The motor of claim 3, wherein the coating comprises a diamond like coating.

9. A fluid dynamic bearing motor, comprising:
 a bearing sleeve having a journal; and
 a shaft disposed in the journal, the shaft comprising an elongate member having a first end, a second end, and an outer radial surface, wherein a diameter of the outer radial surface is tapered in thickness from proximate the first end towards the middle and tapered in thickness from proximate the second end towards the middle;
 wherein the shaft includes a cylindrical shaped member having a coating that varies in thickness.

10. The fluid dynamic bearing motor of claim 9, wherein the coating comprises a diamond like coating.

11. The A fluid dynamic bearing motor comprising:
 a bearing sleeve having a journal; and
 a shaft disposed in the journal, the shaft comprising an elongate member having a first end, a second end, and an outer radial surface, wherein a diameter of the outer radial surface is tapered in thickness from proximate the first end towards the middle and tapered in thickness from proximate the second end towards the middle;

wherein the elongate member includes a coating at the outer radial surface, the coating disposed proximate the first end and extending towards a middle of the member and further disposed proximate the second end and extending towards the middle of the member, the coating thicker proximate the first end and the second end than proximate the middle.

12. The fluid dynamic bearing motor of claim 11, wherein the first end includes a first end face and the second end includes a second end face, and the first end face and the second end face are substantially free of the coating.

13. The fluid dynamic bearing motor of claim 11, wherein the outer radial surface includes a portion most proximate the first end substantially free of the coating, and a portion most proximate the second end substantially free of the coating.

14. The fluid dynamic bearing motor of claim 11, wherein the coating at a thickest point proximate the first end has a thickness between 0.5 µm and 3.0 µm, and at a thickest point proximate the second end has a thickness between 0.5 µm and 3.0 µm.

15. The fluid dynamic bearing motor of claim 14, wherein the coating at the outer radial surface proximate the middle of the member is less than 0.5 µm.

16. The fluid dynamic bearing motor of claim 11, wherein the coating comprises a diamond like coating.

* * * * *